(12) United States Patent
Okamoto et al.

(10) Patent No.: US 12,474,199 B2
(45) Date of Patent: Nov. 18, 2025

(54) LOAD DETECTION MECHANISM AND PIN-TYPE LOAD CELL

(71) Applicants: MINEBEA MITSUMI Inc., Nagano (JP); KITO CORPORATION, Yamanashi (JP)

(72) Inventors: Takuma Okamoto, Cupertino, CA (US); Kazuhiro Nishikawa, Chuo (JP); Takayuki Kasai, Chuo (JP)

(73) Assignees: NAMESBEA MITSUMI Inc. ASSIGNEE, Nagano (JP); KITO CORPORATION, Yamanashi (JP)

( * ) Notice: Subject to any disclaimer, the term of this patent is extended or adjusted under 35 U.S.C. 154(b) by 798 days.

(21) Appl. No.: 17/754,969

(22) PCT Filed: Sep. 3, 2020

(86) PCT No.: PCT/JP2020/033362
§ 371 (c)(1),
(2) Date: Sep. 16, 2022

(87) PCT Pub. No.: WO2021/079630
PCT Pub. Date: Apr. 29, 2021

(65) Prior Publication Data
US 2023/0213372 A1  Jul. 6, 2023

(30) Foreign Application Priority Data
Oct. 21, 2019  (JP) .................................. 2019-192089

(51) Int. Cl.
*G01G 19/18* (2006.01)
*G01L 1/22* (2006.01)

(52) U.S. Cl.
CPC ................ *G01G 19/18* (2013.01); *G01L 1/22* (2013.01)

(58) Field of Classification Search
CPC .......... G01G 19/18; G01G 19/14; G01L 1/22; G01L 1/2206
See application file for complete search history.

(56) References Cited

U.S. PATENT DOCUMENTS 5,456,119 A    10/1995  Nakazaki et al.
10,209,151 B2 * 2/2019  Okada ...................... G01L 3/10
(Continued)

FOREIGN PATENT DOCUMENTS

CN    101846566 A    9/2010
CN    103016622 A    4/2013
(Continued)

OTHER PUBLICATIONS

Notice of Reasons for Refusal dated Oct. 3, 2023 for corresponding Japanese Application No. 2019-192089.
(Continued)

*Primary Examiner* — Laura Martin
*Assistant Examiner* — Julia Fitzpatrick
(74) *Attorney, Agent, or Firm* — Chrisman Gallo Tochtrop LLC (57) ABSTRACT

A load detection mechanism for detecting a load of an object includes a first member connected to a fixed structure; a second member for suspending an object; a pin (CP1, CP2) configured to cause the second member to be suspended from the first member by continuously penetrating the first member and the second member; a plurality of strain gauges (SG1 to SG8) attached to the pin; and a circuit substrate disposed above the second member. A connection circuit (CC) forming a bridge circuit by connecting the plurality of strain gauges and an amplification circuit (AC) configured to amplify output from the bridge circuit are formed on the circuit substrate.

12 Claims, 7 Drawing Sheets

(56) References Cited

U.S. PATENT DOCUMENTS

| | | | |
|---|---|---|---|
| 2013/0067881 A1 | 3/2013 | Khrakovsky et al. | |
| 2013/0305817 A1 | 11/2013 | Magnin et al. | |
| 2015/0297366 A1 | 10/2015 | Hashimoto et al. | |
| 2016/0084720 A1 | 3/2016 | Schmittner et al. | |
| 2017/0307423 A1 | 10/2017 | Pahwa et al. | |
| 2018/0098900 A1 | 4/2018 | Sato et al. | |
| 2018/0235822 A1* | 8/2018 | Wako | G01L 1/2225 |

FOREIGN PATENT DOCUMENTS

| | | | | |
|---|---|---|---|---|
| CN | 104603591 A | | 5/2015 | |
| CN | 105588669 A | | 5/2016 | |
| CN | 107850480 A | | 3/2018 | |
| CN | 207366121 U | | 5/2018 | |
| CN | 108844666 A | | 11/2018 | |
| EP | 3 409 635 A1 | | 12/2018 | |
| JP | H06-061887 U | | 9/1994 | |
| JP | H06-313740 A | | 11/1994 | |
| JP | H08-201192 A | | 8/1996 | |
| JP | 2000-001289 A | | 1/2000 | |
| JP | 2004-123248 A | | 4/2004 | |
| JP | 2009-052977 A | | 3/2009 | |
| JP | 2010-159548 A | | 7/2010 | |
| JP | 2012-233868 A | | 11/2012 | |
| JP | 2016161492 A | * | 9/2016 | B60T 17/221 |
| JP | 2018-128365 A | | 8/2018 | |
| JP | 2018162980 A | * | 10/2018 | B60T 7/042 |
| KR | 100882485 B1 | | 2/2009 | |
| SE | 1251308 A1 | * | 5/2014 | |
| WO | WO-2015145949 A1 | * | 10/2015 | G01L 1/2206 |
| WO | WO-2015198525 A1 | * | 12/2015 | B60T 7/042 |
| WO | WO-20170104123 A1 | * | 6/2017 | |
| WO | WO-2018232865 A1 | * | 12/2018 | B66D 3/12 |

OTHER PUBLICATIONS

Chinese Office Action dated Jan. 24, 2024 for corresponding Chinese Application No. 202080079185.3 and English translation.
Notice of Reasons for Refusal dated Apr. 11, 2023 for corresponding Japanese Application No. 2019-192089.
International Search Report for corresponding International Application No. PCT/JP2020/033362 mailed Oct. 27, 2020.
Written Opinion for corresponding International Application No. PCT/JP2020/033362 dated Oct. 27, 2020.
Notice of Reasons for Refusal dated Dec. 24, 2024 for corresponding Chinese Application No. 202080079185.3 and English translation.
Nanjing Port Longtan Container Co. Ltd., "Design and application of pin-type load cell for crane", Jiangsu (Province) Nanjing 210000, Dec. 31, 2008.
English translation of the Written Opinion in corresponding International Application No. PCT/JP2020/033362; Mailing date: Oct. 27, 2020.

* cited by examiner

LOAD DETECTION MECHANISM AND PIN-TYPE LOAD CELL

CROSS-REFERENCE TO RELATED APPLICATIONS

This application is a U.S. National Stage entry of PCT/JP2020/033362, filed Sep. 3, 2020, which claims benefit of priority to Japanese application 2019-192089, filed Oct. 21, 2019, the entire disclosures of which are hereby incorporated herein by reference.

TECHNICAL FIELD

The present invention relates to a load detection mechanism and a pin-type load cell.

BACKGROUND ART

As hoisting machines such as a crane or a chain block, a hoisting machine including a load detector is known.

Patent Document 1 discloses that a first coupling member and a second coupling member forming a load transfer system of a crane or a mooring device are coupled by a coupling pin and the magnitude of a relative load in an opposite direction applied between the first coupling member and the second coupling member is detected by a strain gauge attached to the coupling pin.

CITATION LIST

Patent Literature

Patent Document 1: JP 8-201192 A

SUMMARY OF INVENTION

Technical Problem

Mechanisms including a coupling pin as in Patent Document 1 are not limited to large mechanisms for outdoor use such as cranes and also include relatively small mechanisms for indoor use, and the type and size of a coupling pin included in each mechanism vary.

An object of the present invention is to provide a load detection mechanism capable of performing load detection by using a relatively small pin-type member, and a relatively small pin-type load cell also available for the mechanism.

Solution to Problem

In accordance with a first aspect of the present invention, there is provided a load detection mechanism for detecting a load of an object, the load detection mechanism including:
 a first member connected to a fixed structure;
 a second member suspending the object;
 a pin causing the second member to be suspended from the first member by continuously penetrating the first member and the second member;
 a plurality of strain gauges attached to the pin; and
 a circuit substrate disposed above the second member, wherein
 a connection circuit forming a bridge circuit by connecting the plurality of strain gauges and an amplification circuit amplifying output from the bridge circuit are formed on the circuit substrate.

In the load detection mechanism of the first aspect, a groove extending in an axial direction of the pin may be formed at an outer peripheral surface of the pin, and a wiring connecting the plurality of strain gauges and the circuit substrate may be accommodated inside the groove.

In the load detection mechanism of the first aspect, at least one of the first member and the second member may cover the groove.

In the load detection mechanism of the first aspect, the circuit substrate may be disposed within a closed space defined inside the second member.

In the load detection mechanism of the first aspect, one end of the pin may be located within the closed space and the circuit substrate may be disposed below the one end.

In the load detection mechanism of the first aspect, an orientation adjustment part adjusting an orientation of the pin may be attached to at least one of the first member and the second member.

In accordance with a second aspect of the present invention, there is provided a pin-type load cell including:
 a pin; and
 a strain gauge attached to the pin, wherein
 a groove accommodating a wiring connecting the strain gauge and an exterior is formed at an outer peripheral surface of the pin, the groove extending in an axial direction of the pin.

Advantageous Effects of Invention

A load detection mechanism of the present invention can perform load detection by using a relatively small pin-type member. Furthermore, the present invention can provide a relatively small pin-type load cell.

BRIEF DESCRIPTION OF DRAWINGS

FIG. 2 is an exploded perspective view of the electric balancer according to the embodiment of the present invention. In FIG. 2, a driving mechanism, a suspension part, and a control unit are omitted.

FIG. 4(*a*) to FIG. 4(*d*) are cross-sectional views of the coupling pin taken along planes orthogonal to a central axis. FIG. 4(*a*) is a cross-sectional view of a part formed with an orientation adjustment surface near a front end, FIG. 4(*b*) is a cross-sectional view of a part formed with a recess part of a front small diameter part, FIG. 4(*c*) is a cross-sectional view of a part formed with a central wiring groove of a central large diameter part, and FIG. 4(*d*) is a cross-sectional view of a part formed with a back wiring groove of a back large diameter part.

DESCRIPTION OF EMBODIMENTS

Embodiments

An electric balancer 100 of an embodiment of the present invention will be described with reference to FIG. 1 to FIG. 7.

Figure 1:
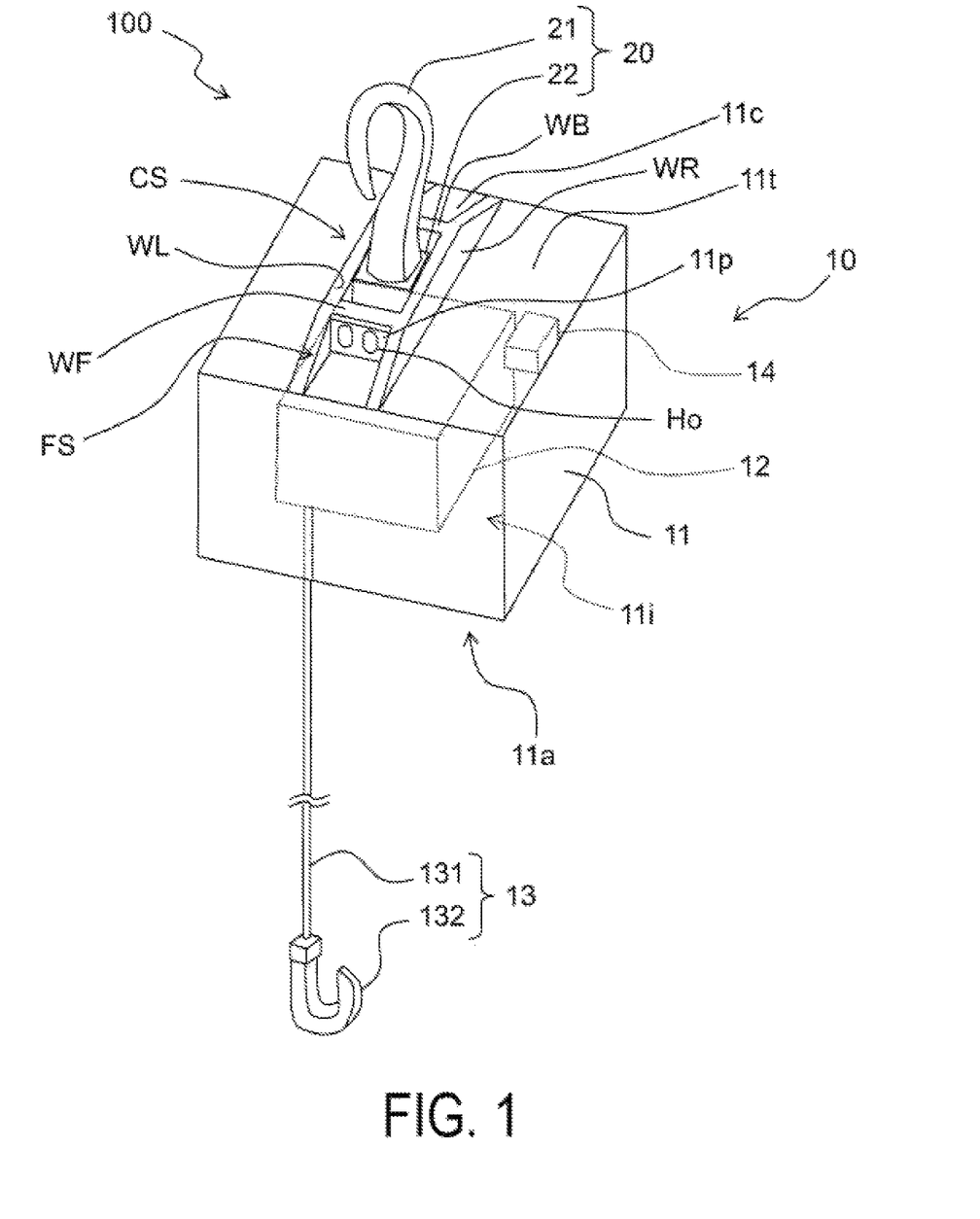
FIG. 1 is a perspective view of an electric balancer according to an embodiment of the present invention.
Figure 2:
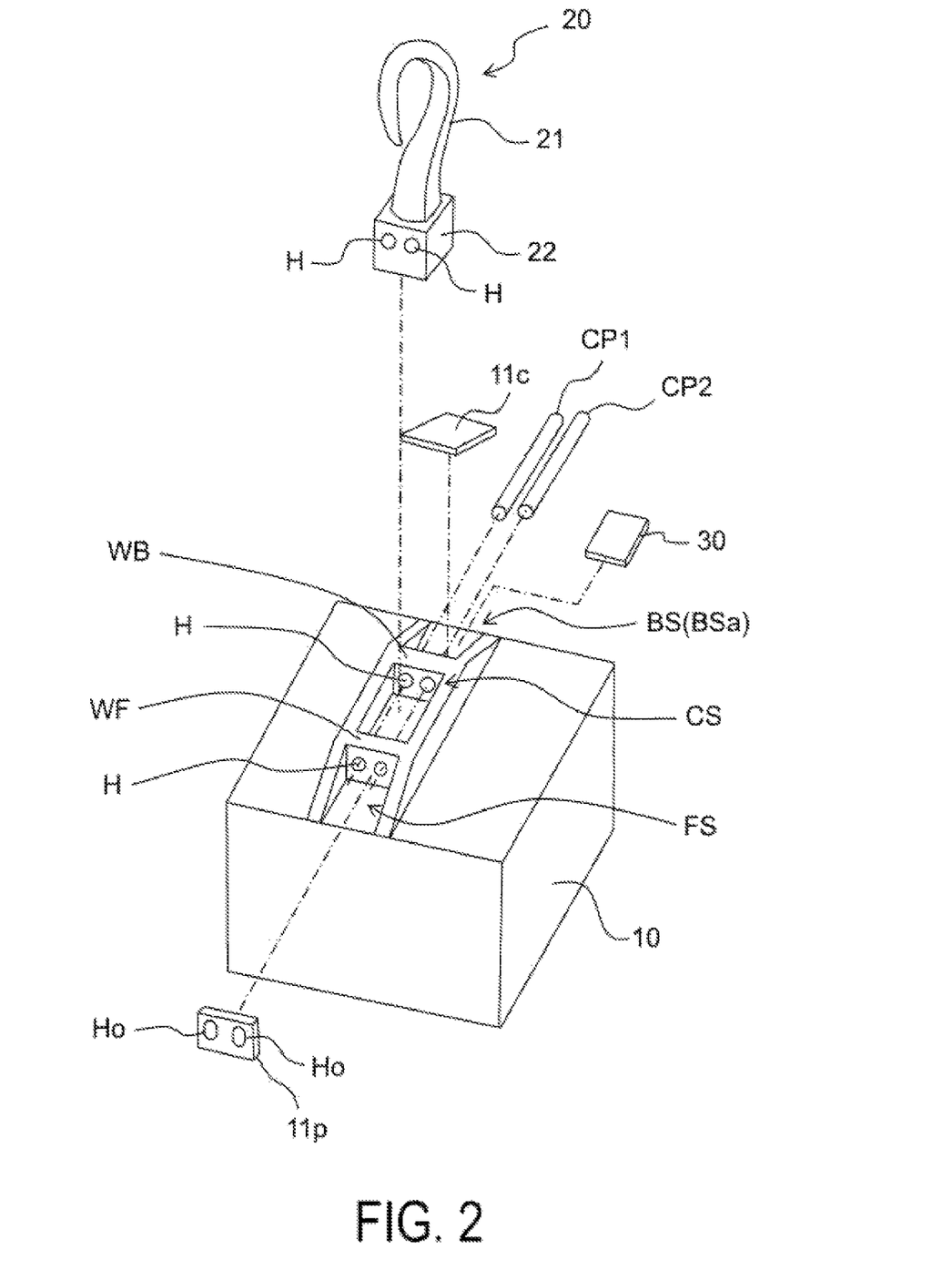

As illustrated in FIG. 1 and FIG. 2, the electric balancer 100 mainly includes a body part 10, a hook part 20, two coupling pins CP1 and CP2 for coupling the body part 10 and the hook part 20, eight strain gauges SG1 to SG8 (FIG. 6) attached to each of the coupling pins CP1 and CP2, and a circuit substrate 30 installed at the body part 10.

In the following description, a direction of arranging the body part 10 and the hook part 20 is referred to as a vertical direction of the electric balancer 100, and a side where the hook part 20 is located is referred to as an upper side. Furthermore, among in-plane directions of an orthogonal plane orthogonal to the vertical direction, a direction along a bending direction of an upper hook 21 (described below in detail) of the hook part 20 is referred to as a front-back direction of the electric balancer 100, and a direction orthogonal to the front-back direction is referred to as a width direction of the electric balancer 100. In the front-back direction, an opening direction (near side of FIG. 1) of the upper hook 21 is referred to as the front. A left and a right when viewed from the front to the back are referred to as a left and a right in the width direction.

The body part 10 is a part for suspending an object to be moved and, for example, raising or lowering the object to be moved. The body part 10 mainly includes a housing 11, a driving mechanism 12 accommodated in the housing 11, a suspension part 13 driven by the driving mechanism 12, and a control unit 14 for controlling the driving mechanism 12.

The housing 11 is made of, for example, a steel material, and has a box shape opened downward. A driving mechanism accommodation space 11i is defined inside the housing 11, and an opening 11a allowing the driving mechanism accommodation space 11i to communicate with the outside is defined at a lower end part of the housing 11.

At the left of the center of an upper surface 11t of the housing 11 in the width direction, a left convex wall WL is formed to stand upright from the upper surface 11t and extend in the front-back direction. The left convex wall WL is trapezoidal when viewed in the width direction, and is formed so that a lower base extends across the whole area of the upper surface 11t in the front-back direction.

At the right of the center of the upper surface 11t of the housing 11 in the width direction, a right convex wall WR is formed to stand upright from the upper surface 11t and extend in the front-back direction. The right convex wall WR has the same shape as the left convex wall WL and is formed in parallel to the left convex wall WL, and a lower base extends across the whole area of the upper surface 11t in the front-back direction.

Between the left convex wall WL and the right convex wall WR, a front convex wall WF and a back convex wall WB are formed to stand upright from the upper surface 11t and extend in the width direction. The front convex wall WF and the back convex wall WB have the same shape as each other, and are substantially square when viewed in the front-back direction. The front convex wall WF and the back convex wall WB are formed in parallel to each other.

A left end part of the front convex wall WF is connected to the vicinity of a front end of the left convex wall WL, and a right end part of the front convex wall WF is connected to the vicinity of a front end of the right convex wall WR. Furthermore, a left end part of the back convex wall WB is connected to the vicinity of a back end of the left convex wall WL, and a right end part of the back convex wall WB is connected to the vicinity of a back end of the right convex wall WR.

At the front convex wall WF, two coupling holes H passing through the front convex wall WF in the front-back direction are formed side by side in the width direction. Similarly, also at the back convex wall WB, two coupling holes H passing through the back convex wall WB in the front-back direction are formed side by side in the width direction. The cross-sectional shape of the coupling hole H of the front convex wall WF and the cross-sectional shape of the coupling hole H of the back convex wall WB are the same as each other, and are circular. As illustrated in FIG. 2, the two coupling holes H of the front convex wall WF and the two coupling holes H of the back convex wall WB are coaxially disposed side by side in the front-back direction.

A front space FS surrounded by the left convex wall WL, the right convex wall WR, and the front convex wall WF is defined in front of the front convex wall WF. The front space FS is a triangular columnar space with the width direction as an axial direction, and is open obliquely upward and forward. The front space FS and the driving mechanism accommodation space 11i are separated by the upper surface 11t.

An orientation adjustment plate 11p is fixed at the front surface of the front convex wall WF. As illustrated in FIG. 2, the orientation adjustment plate 11p is a substantially rectangular flat plate, and has two orientation adjustment holes Ho passing through the orientation adjustment plate 11p in a plate thickness direction. The orientation adjustment plate 11p may also be referred to as a "pin fixing plate" or the like. As will be described below, in summary, the pin fixing plate has a function of vertically aligning strain gauge attachment surfaces (bottom surface of recess parts Rb and Rd) of the two coupling pins CP1 and CP2.

Each of the cross-sections of the two orientation adjustment holes Ho has a shape with linear parts obtained by cutting out two places on the circumference. In the present embodiment, in a state where the orientation adjustment plate 11p is attached to the front convex wall WF, linear parts opposing each other are formed to extend in the vertical direction.

The orientation adjustment plate 11p is fixed at the front surface of the front convex wall WF by bolting through a mounting hole (not illustrated). In a state where the orientation adjustment plate 11p is attached to the front convex wall WF, the two orientation adjustment holes Ho overlap the two coupling holes H of the front convex wall WF.

A central space CS surrounded by the left convex wall WL, the right convex wall WR, the front convex wall WF, the back convex wall WB is defined at the back of the front convex wall WF. The central space CS is a substantially square space and is open upward. The central space CS and the driving mechanism accommodation space 11i are separated by the upper surface 11t.

A back space BS surrounded by the left convex wall WL, the right convex wall WR, and the back convex wall WB is defined at the back of the back convex wall WB. The back space BS is a triangular columnar space with the width direction as the axial direction, and is open obliquely upward and backward via an opening BSa. The back space BS and the driving mechanism accommodation space 11i are separated by the upper surface 11t.

A protective cover 11c is attached to the opening BSa to block the entire opening BSa. The protective cover 11c is, for example, a flat plate made of the same material as the housing 11. The protective cover 11c may be fixed at the housing 11 by screws, bolts, or the like.

The driving mechanism 12 is disposed at the driving mechanism accommodation space 11i of the housing 11. The driving mechanism 12 mainly includes a not-illustrated motor, transfer system, and drum, and is configured so that rotation of the motor is transferred to the drum via the transfer system.

The suspension part 13 includes a chain 131 and a lower hook 132 coupled to a lower end part of the chain 131. An upper end part of the chain 131 is wound around the drum (not illustrated) of the driving mechanism 12 via the opening 11a of the housing 11. Consequently, the length of the chain 131 hanging downward from the housing 11 changes according to the rotation of the drum, and the lower hook 132 moves up and down.

The control unit 14 is disposed at the driving mechanism accommodation space 11i of the housing 11. The control unit 14 controls the driving of the motor of the driving mechanism 12 on the basis of input from an operator via a remote controller (not illustrated) or input (described below in detail) from the circuit substrate 30.

The hook part 20 is a structure for suspending the electric balancer 100 from a fixed structure such as a beam. The hook part 20 is made of, for example, a steel material.

The hook part 20 mainly includes the upper hook 21 and a coupling base 22 connected to a lower end part of the upper hook 21. The upper hook 21 and the coupling base 22 may be integrally formed.

The upper hook 21 may be any hook, and a hook with a latch may be used.

The coupling base 22 is a substantially square solid body. At the coupling base 22, two coupling holes H passing through the coupling base 22 in the front-back direction are formed side by side in the width direction. The cross-sectional shape of each of the two coupling holes H is circular.

The coupling base 22 is disposed inside the central space CS of the housing 11 of the body part 10. The coupling base 22 is disposed at the body part 10 so that the two coupling holes H of the coupling base 22 are disposed coaxially with the two coupling holes H of the front convex wall WF and the two coupling holes H of the back convex wall WB.

The two coupling pins CP1 and CP2 have a substantially cylindrical shape with a diameter of about 8 to 12 mm and a length of about 80 to 100 mm, and are disposed to continuously penetrate the respective coupling holes H so as to couple the body part 10 and the hook part 20. Since the configurations of the coupling pins CP1 and CP2 are the same as each other, the following description will be focused on the coupling pin CP1.

Figure 3:
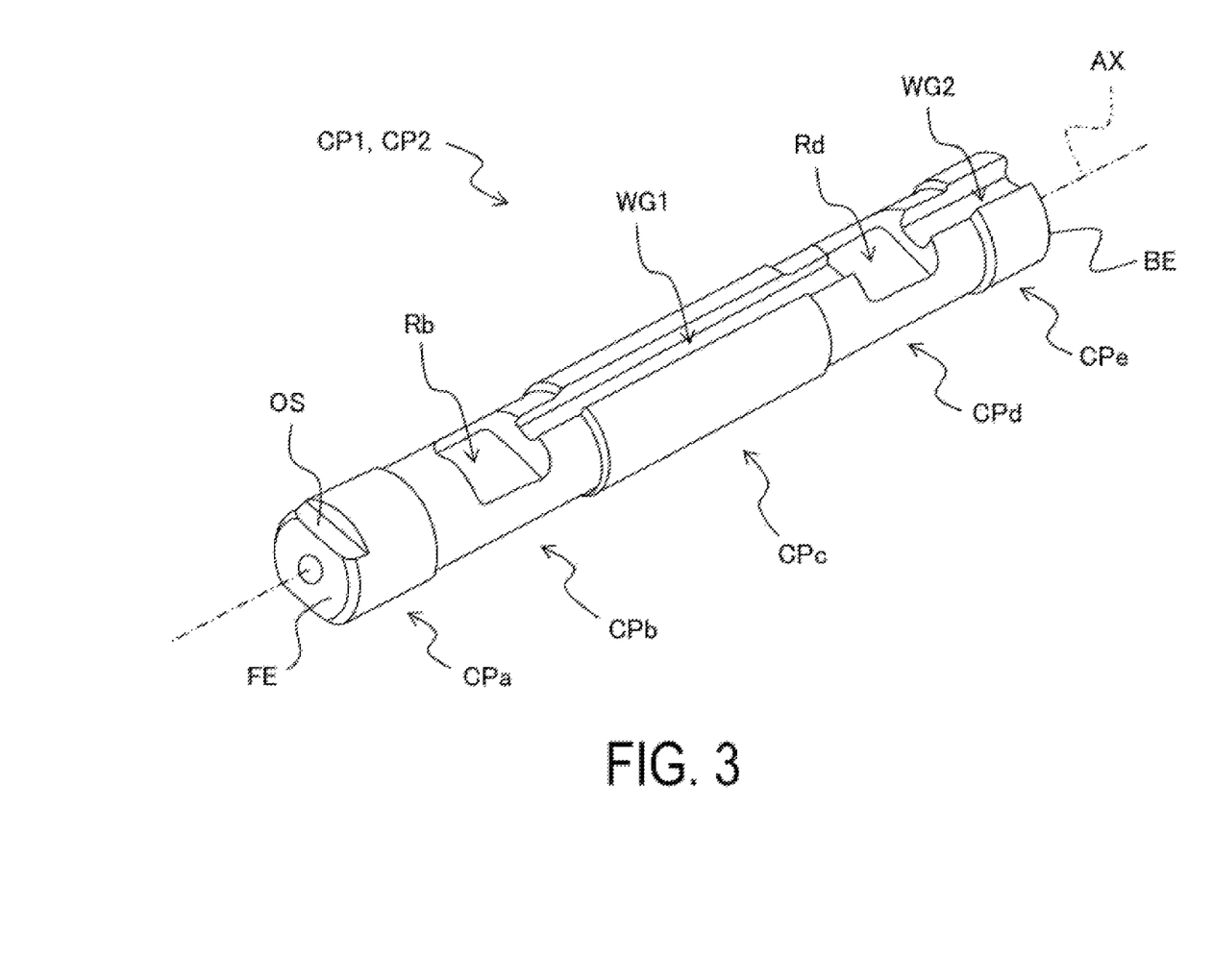
FIG. 3 is a perspective view of a coupling pin.
Figure 4:
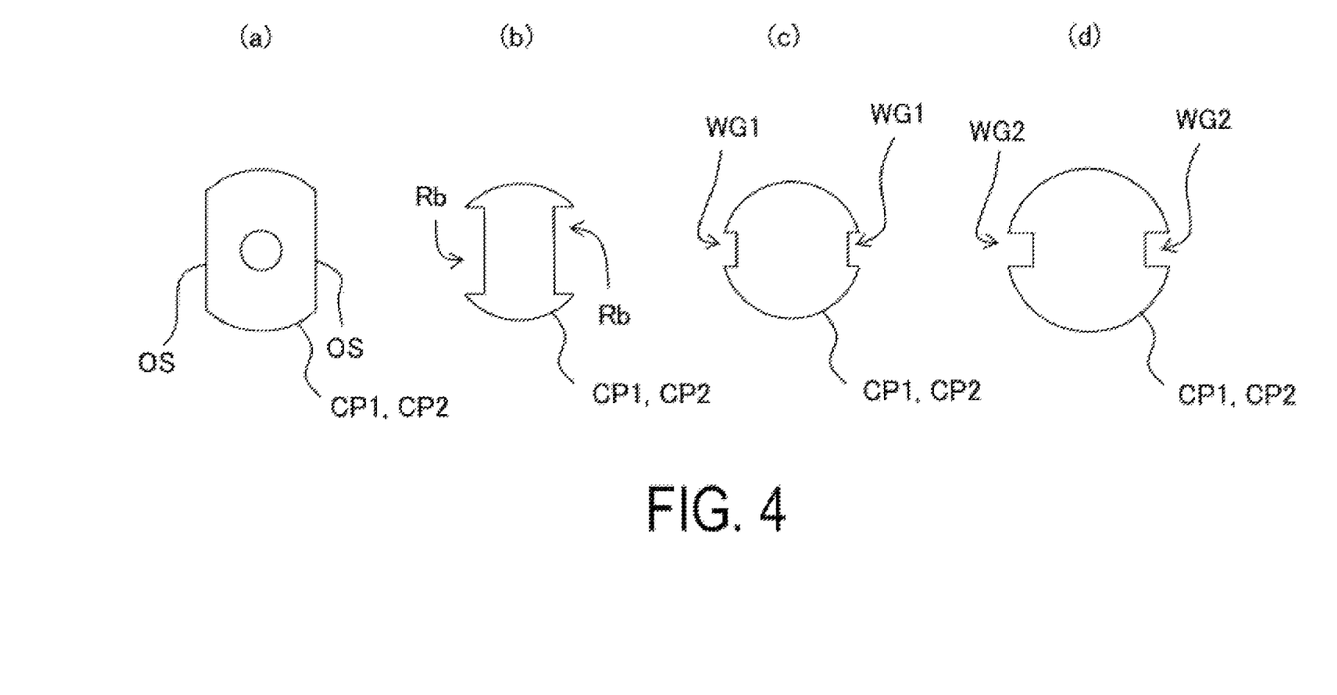

The coupling pin CP1 is made of, for example, a steel material and has a substantially cylindrical shape with a central axis AX. The coupling pin CP1 is disposed inside the electric balancer 100 so that the left side in FIG. 3 is located at the front of the electric balancer 100. Therefore, for convenience in the following description, the left end in FIG. 3 is referred to as a front end FE of the coupling pin CP1 and the right end in FIG. 3 is referred to as a back end BE of the coupling pin CP1.

The coupling pin CP1 is partitioned into a front large diameter part CPa, a front small diameter part CPb, a central large diameter part CPc, a back small diameter part CPd, and a back large diameter part CPe from the front end FE toward the back end BE.

The diameter of the front large diameter part CPa, the diameter of the central large diameter part CPc, and the diameter of the back large diameter part CPe are equal to each other, and are about 5 mm to 20 mm, for example. The diameter of the front small diameter part CPb and the diameter of the back small diameter part CPd are equal to each other, and is smaller than the diameter of the front large diameter part CPa by about 1 mm to 5 mm, for example.

At a region near the front end FE of the front large diameter part CPa, a pair of orientation adjustment surfaces OS extending in parallel to the central axis AX are formed by a pair of D-cut parts (FIG. 4(a)).

At the axial center of the front small diameter part CPb, a pair of the recess parts Rb with the radial direction of the coupling pin CP1 as a depth direction are formed to oppose each other in the radial direction (FIG. 4(b)). The shape of each of the recess parts Rb is substantially square when viewed in the radial direction. Each of the recess parts Rb is formed so that the bottom surface of the recess part Rb is parallel to the orientation adjustment surface OS.

Similarly, at the axial center of the back small diameter part CPd, a pair of the recess parts Rd with the radial direction of the coupling pin CP1 as the depth direction are formed to oppose each other in the radial direction. The shape of each of the recess parts Rd is substantially square when viewed in the radial direction. Each of the recess parts Rd is formed so that the bottom surface of the recess part Rd is parallel to the orientation adjustment surface OS.

A pair of central wiring grooves WG1 extending from the pair of recess parts Rb to the pair of recess parts Rd along the axial direction and a pair of back wiring grooves WG2 extending from the pair of recess parts Rd to the back ends BE along the axial direction are formed at an outer peripheral surface of the coupling pin CP1.

The pair of central wiring grooves WG1 are separated by 180° in the circumferential direction of the coupling pin CP1, and the pair of back wiring grooves WG2 are also separated by 180° in the circumferential direction of the coupling pin CP1. Each of the pair of central wiring grooves WG1 and a corresponding one of the pair of back wiring grooves WG2 are formed at the same positions in the circumferential direction.

Figure 5:
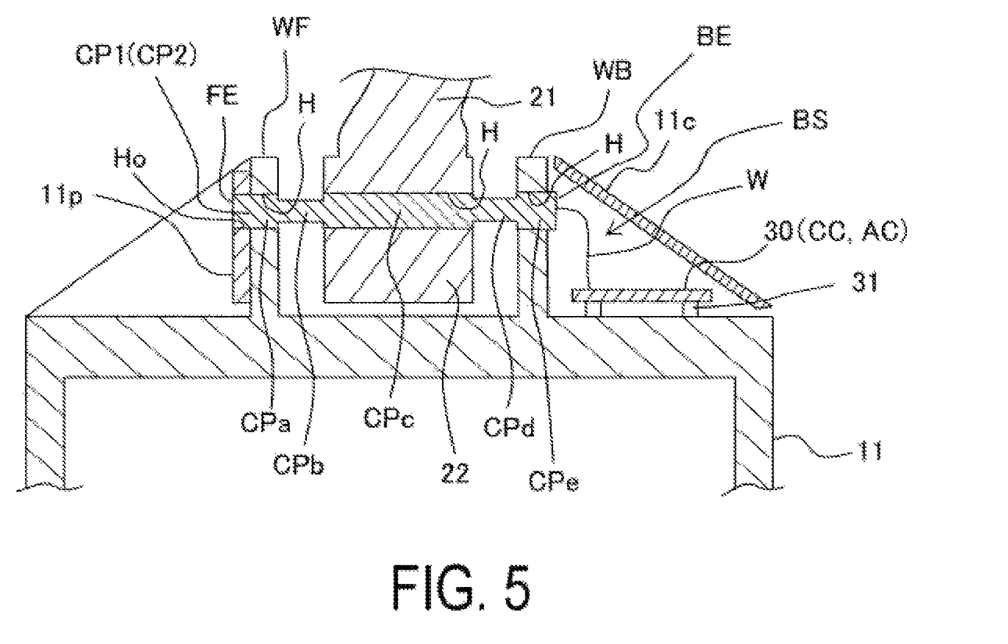
FIG. 5 is a partially enlarged cross-sectional view of the electric balancer taken along a plane including a central axis of the coupling pin and orthogonal to a width direction, and illustrates a state where a body part and a hook part are coupled by the coupling pin.

As described above, the two coupling pins CP1 and CP2 are inserted into the coupling holes H of the front convex wall WF and the coupling holes H of the back convex wall WB of the housing 11 of the body part 10 and the coupling holes H of the coupling base 22 of the hook part 20, and couple the body part 10 and the hook part 20 (FIG. 5).

Specifically, the front large diameter parts CPa of the coupling pins CP1 and CP2 are inserted into the coupling holes H of the front convex wall WF of the housing 11 and accommodated in the coupling holes H. The central large diameter parts CPc are inserted into the coupling holes H of the coupling base 22 and accommodated in the coupling holes H. The back large diameter parts CPe are inserted into the coupling holes H of the back convex wall WB and accommodated in the coupling holes H. In this arrangement, the front small diameter parts CPb of the coupling pins CP1 and CP2 are located between the back surface of the front convex wall WF and the front surface of the coupling base 22, and the back small diameter parts CPd are located between the back surface of the coupling base 22 and the front surface of the back convex wall WB.

The coupling pins CP1 and CP2 are disposed so that the bottom surfaces of the pair of recess parts Rb of the front small diameter part CPb and the bottom surfaces of the pair of recess parts Rd of the back small diameter part CPd extend in the vertical direction. This arrangement can be easily performed by fitting the front ends FE of the coupling pins CP1 and CP2 formed with the pair of orientation adjustment surfaces OS to the orientation adjustment holes Ho of the orientation adjustment plate 11p attached to the front surface of the front convex wall WF. The use of the orientation adjustment plate 11p enable formation of a hole shape suitable for orientation adjustment more easily than formation of the coupling holes H of the front convex wall WF of the body part 10 into a shape suitable for orientation alignment.

The eight strain gauges SG1 to SG8 are attached to each of the coupling pins CP1 and CP2.

Among the eight strain gauges SG1 to SG8, two strain gauges are attached to the bottom surface of each of the pair of recess parts Rb of the front small diameter part CPb, and two strain gauges are attached to the bottom surface of each of the pair of recess parts Rd of the back small diameter part CPd. Specifically, the SG1I and the SG2 are attached to the bottom surface of one of the pair of recess parts Rb of the front small diameter part CPb, the SG3 and the SG4 are attached to the bottom surface of the other one of the pair of recess parts Rb, the SG5 and the SG6 are attached to the bottom surface of one of the pair of recess parts Rd of the back small diameter part CPd, and the SG7 and the SG8 are attached to the bottom surface of the other one of the pair of recess parts Rd.

Figure 6:
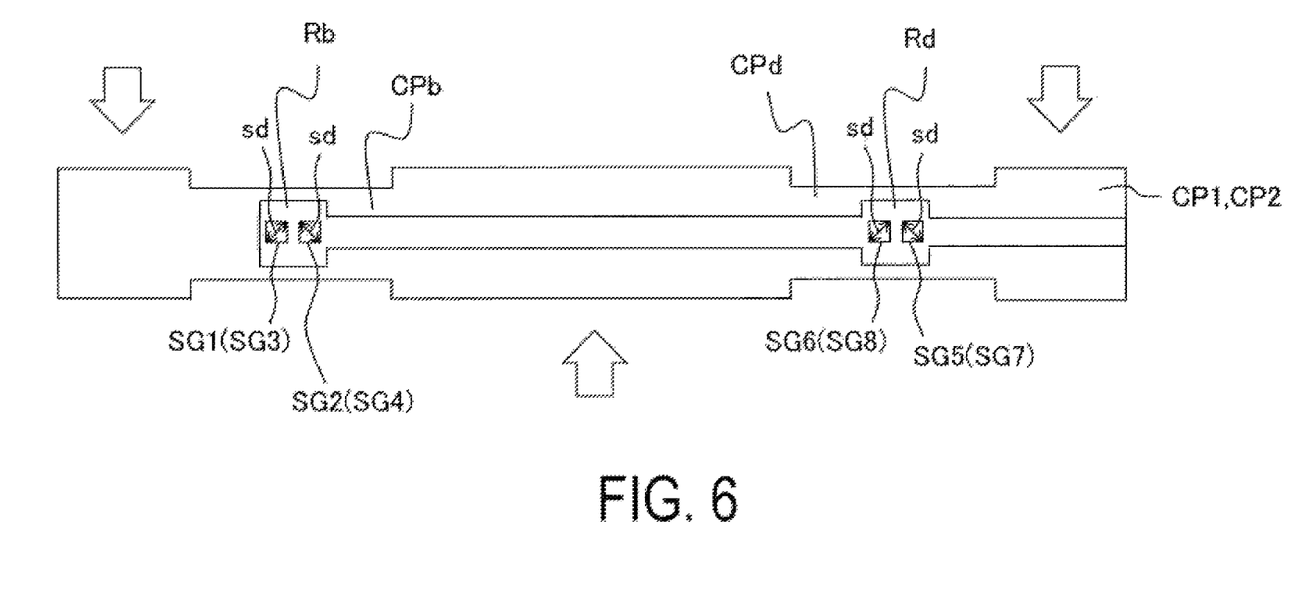
FIG. 6 is an explanatory diagram for explaining a method for detecting a load by using a pin-type load cell.

As illustrated in FIG. 6, the strain gauge SGI is attached to the bottom surface of one of the pair of recess parts Rb so that a sensitive direction sd is inclined at 45° counterclockwise with respect to the axial direction. The strain gauge SG2 is attached adjacent to the strain gauge SG1 so that the sensitive direction sd is inclined at 45° clockwise with respect to the axial direction. The strain gauge SG3 is attached to the bottom surface of the other one of the pair of recess parts Rb so that the arrangement and the sensitive direction sd coincide with the arrangement and the sensitive direction sd of the strain gauges SG1 when viewed in the radial direction. The strain gauge SG4 is attached to the bottom surface of the other one of the pair of recess parts Rb so that the arrangement and the sensitive direction sd coincide with the arrangement and the sensitive direction sd of the strain gauges SG2 when viewed in the radial direction.

Similarly, the strain gauge SG5 is attached to one of the pair of recess parts Rd so that the sensitive direction sd coincides with the direction inclined at 45° clockwise with respect to the axial direction. The strain gauge SG6 is attached adjacent to the strain gauge SG5 so that the sensitive direction sd coincides with the direction inclined at 45° counterclockwise with respect to the axial direction. The strain gauge SG7 is attached to the bottom surface of the other one of the pair of recess parts Rd so that the arrangement and the sensitive direction sd coincide with the arrangement and the sensitive direction sd of the strain gauges SG5 when viewed in the radial direction. The strain gauge SG8 is attached to the bottom surface of the other one of the pair of recess parts Rd so that the arrangement and the sensitive direction sd coincide with the arrangement and the sensitive direction sd of the strain gauges SG6 when viewed in the radial direction.

The circuit substrate 30 is a printed substrate obtained by printing a wiring on an insulator substrate, and is installed above the upper surface 11t via a support base 31 inside the back space BS formed at the housing 11 of the body part 10. The printed wiring includes a connection wiring CC and an amplification circuit AC.

The circuit substrate 30 is disposed at the back space BS being a closed space covered by the protective cover 11c, and thus it is possible to prevent the occurrence of an error at the circuits on the circuit substrate 30 due to the influence of changes in wind or humidity. Furthermore, since the back space BS is a separate space separated from the driving mechanism accommodation space 11i, an error is prevented from occurring at the circuit substrate 30 due to vibration of a motor or the like installed at the driving mechanism accommodation space 11i. Furthermore, the circuit substrate 30 is disposed on the support base 31, and thus heat can be efficiently dissipated from the circuit substrate 30.

Figure 7:
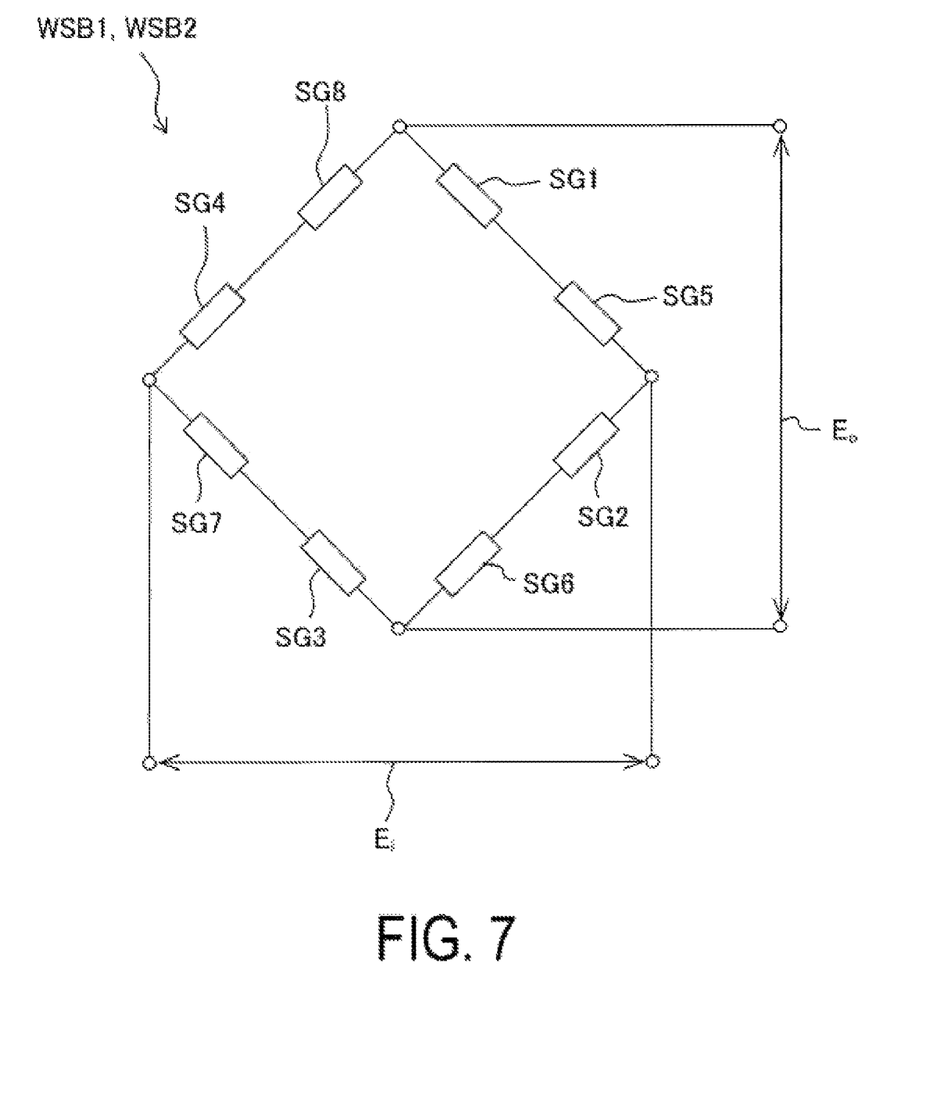
FIG. 7 is a circuit diagram of a Wheatstone bridge circuit configured inside the electric balancer.

The connection circuit CC is a circuit forming a Wheatstone bridge circuit by connecting the plurality of strain gauges. The connection circuit CC is connected via wirings W to the strain gauges SG1 to SG8 attached to the coupling pin CP1 and the strain gauges SG1 to SG8 attached to the coupling pin CP2. Thus, a Wheatstone bridge circuit WSB1 is configured by the strain gauges SG1 to SG8 attached to the coupling pin CP1, the connection circuit CC, and the wiring W connecting the strain gauges SG1 to SG8 and the connection circuit CC, and a Wheatstone bridge circuit WSB2 is configured by the strain gauges SGI to SG8 attached to the coupling pin CP2, the connection circuit CC, and the wiring W connecting the strain gauges SG1 to SG8 and the connection circuit CC (FIG. 7). In this way, the connection circuit CC is disposed above the body part 10 instead of above the coupling pins CP1 and CP2, and thus the diameters of the coupling pins CP1 and CP2 can be reduced.

The wirings W (FIG. 5) extend from the respective strain gauges SGI to SG8 to the back ends BE of the coupling pins CP1 and CP2 through the central wiring grooves WG1 and the back wiring grooves WG2, and extend from the back ends BE to the circuit substrate 30 through the inside of the back space BS. Since the circuit substrate 30 installed at the upper surface 11t is located below the back ends BE of the coupling pins CP1 and CP2 disposed at the coupling holes H of the back convex wall WB, the wirings from the coupling pins CP1 and CP2 can be easily connected to the connection circuit CC at the upper surface of the circuit substrate 30.

By routing the wirings W in this way, that is, by disposing the wirings W inside the central wiring grooves WG1 and the back wiring grooves WG2 and covering the wirings W with the front convex wall WF, the coupling base 22, and the back convex wall WB, the wirings W are less likely to be affected by disturbance, so that the occurrence of noise is prevented at the wirings W.

The amplification circuit AC is a circuit for amplifying an output voltage $E_O$ from the Wheatstone bridge circuit WSB1 and WSB2.

Output sides of the Wheatstone bridge circuit WSB1 and WSB2 are connected to an input side of the amplification circuit AC on the circuit substrate 30. An output side of the amplification circuit AC is connected to the control unit 14 of the body part 10 via a wiring (not illustrated).

Next, a method of using the electric balancer 100 of the present embodiment will be described.

An object to be moved using the electric balancer 100 is moved with the upper hook 21 of the hook part 20 hooked on a fixed structure such as a beam. The fixed structure for hooking the upper hook 21 may be movable in a horizontal direction. In the present invention and the present specification, the "fixed structure" means a structure for holding a load detection structure such as an electric balancer in a mode suitable for use when the load detection structure is used, and does not mean a structure immovable in all directions.

Next, the lower hook 132 of the suspension part 13 of the body part 10 is hooked on the object to be moved. Specifically, for example, the lower hook 132 is hooked on an object to be moved placed at a floor surface, and a remote controller (not illustrated) or the like is operated to wind up the chain 131 via the driving mechanism 12. Thus, the lower hook 132 is moved upward and the object to be moved is also moved upward.

To further move the object to be moved upward while the moving object is suspended by the electric balancer 100, the object to be moved is lightly pushed upward by hand, for example. Thus, the control unit 14 detects that the load applied to the electric balancer 100 by the object to be moved has decreased, and drives the driving mechanism 12 in the direction of winding up the chain 131 on the basis of the detection.

On the contrary, to move the object to be moved downward, the object to be moved is lightly pressed downward by hand, for example. Thus, the control unit 14 detects that the load applied to the electric balancer 100 by the object to be moved has increased, and drives the driving mechanism 12 in the direction of paying out the chain 131 on the basis of the detection.

The control unit 14 detects changes in the load applied to the electric balancer 100 by the object to be moved, as follows.

When the magnitude of the load applied downward to the body part 10 is changed while the upper hook 21 of the hook part 20 is hooked on the fixed structure, the amounts of deflection of the front small diameter part CPb and the back small diameter part CPd of the coupling pins CP1 and CP2 change. Thus, since outputs from the strain guauges SG1 to SG8 attached to the front small diameter part CPb and the back small diameter part Cpd change, the output voltages $E_O$ of the Wheatstone bridge circuits WSB1 and WSB2 also change.

The control unit 14 receives an output voltage signal amplified via the amplification circuit AC, and detects changes in load on the basis of changes in the output voltage signal.

Next, effects of the electric balancer 100 of the present embodiment will be described.

In the electric balancer 100 of the present embodiment, the connection circuit CC forming the Wheatstone bridge circuit is not formed on the coupling pins CP1 and CP2, but on the circuit substrate 30 disposed at the housing 11 of the body part 10. Consequently, the coupling pins CP1 and CP2 having a small size can be used as a flexure element.

In this way, the capability of using the coupling pins CP1 and CP2 having a small size as a flexure element is advantageous in the following points. That is, a coupling pin not planned to be used as a flexure element and designed to be small due to design reasons or the like can be diverted to a flexure element for load detection without making major design changes. Thus, it is possible to increase the degree of freedom in design.

The position of the circuit substrate 30 is made closer to the coupling pins CP1 and CP2 and the wirings W are shortened, so that it is possible to prevent the occurrence of noise at the wirings W and improve the detection accuracy.

In the electric balancer 100 of the present embodiment, the central wiring grooves WG1 and the back wiring grooves WG2 are formed at the surfaces of the coupling pins CP1 and CP2, and the wirings W connecting the strain gauges SG1 to SG8 and the connection circuit CC are accommodated inside the central wiring grooves WG1 and the back wiring grooves WG2. In this way, providing the wiring grooves at the surfaces of the coupling pins CP1 and CP2 is advantageous in the following points.

That is, when a through hole for wiring is formed at an axis center part of a pin with a small diameter, it is not easy to process the through hole. For example, it is necessary to process the through hole by using a drill with a very small diameter, but a drill blade with a small diameter is severely damaged and required to be frequently replaced. Therefore, it is costly and time-consuming to manufacture a small diameter pin having a through hole. On the other hand, since the processing for providing a groove on an outer peripheral surface is relatively easy, the manufacturing cost can be reduced.

In the electric balancer 100 of the present embodiment, the central large diameter part CPc is disposed inside the coupling hole H of the coupling base 22 of the hook part 20, and most of the wiring W accommodated in the central wiring groove WG1 is covered with the coupling base 22. Furthermore, the back large diameter part CPe is disposed inside the coupling hole H of the back convex wall WB, and most of the wiring W accommodated in the back wiring groove WG2 is covered with the back convex wall WB. When the wiring W becomes long, noise is likely to occur in a signal in the wiring W due to the influence of wind or the like, but covering the wiring W with the coupling base 22 or the like prevents the occurrence of noise at the wiring W, and although the Wheatstone bridge WSB with a long wiring is formed, the influence of noise on the output voltage $E_o$ of the Wheatstone bridge WSB can be suppressed.

In the electric balancer 100 of the present embodiment, the circuit substrate 30 is disposed inside the back space BS being a closed space covered with the protective cover 11c. Furthermore, the back ends BE of the coupling pins CP1 and CP2 are also located inside the back space BS, and the wirings W extending from the back ends BE to the circuit substrate 30 are also disposed inside the back space BS. Consequently, the occurrence of noise at the wirings W extending from the back ends BE to the circuit substrate 30 is suppressed.

In summary, the electric balancer 100 of the present embodiment provides a design option to use a small coupling pin as a flexure element by providing the connection circuit CC at the circuit substrate 30 above the body part 10 instead of above the coupling pins CP1 and CP2 and forming wiring grooves on the outer peripheral surfaces of the coupling pins CP1 and CP2. Moreover, in the electric balancer 100 of the present embodiment, the connection circuit CC is provided at a position separated from the coupling pins CP1 and CP2, and noise likely to occur by arranging the wiring W at the central wiring groove WG1 and the back wiring groove WG2 is suppressed by covering the wiring W with the body part 10 and the hook part 20, the wiring W connecting the strain gauges SG1 to SG8 and the connection circuit, the central wiring groove WG1 and the back wiring groove WG2 being open grooves.

MODIFIED EXAMPLE

In the electric balancer 100 of the above embodiment, the following modifications can also be used.

In the electric balancer 100 of the above embodiment, the front convex wall WF of the body part 10, the coupling base 22 of the hook part 20, and the back convex wall WB of the body part 10 are disposed in this order in the front-back direction, and the body part 10 is suspended from the hook part 20 by inserting the coupling pins CP1 and CP2 into the coupling holes H provided at the front convex wall WF, the coupling base 22, and the back convex wall WB; however, the embodiment is not limited to this configuration.

Specifically, for example, a front downwardly hanging part of the upper hook, a convex part at the top surface of the body part, and a back downwardly hanging part of the upper hook are disposed in this order in the front-back direction, and the body part can also be suspended from the hook part by inserting coupling pins into continuous penetration holes provided at the front downwardly hanging part, the convex part, and the back downwardly hanging part. In this aspect, the orientation adjustment plate 11p may be attached to a front surface of the front downwardly hanging part of the upper hook.

In addition, the coupling pin may couple the body part 10 and the hook part 20 in any mode of continuously penetrating the body part 10 and the hook part 20. In the present specification and the present invention, the wording that a pin continuously penetrates one member (first member) and another member (second member) is assumed to include a mode where the pin passes through both the first member and the second member, a mode where the pin passes through only one of the first member and the second member, and a mode where the pin is only inserted into the first member and the second member without passing through any of the first member and the second member.

Furthermore, the number of the coupling pins for coupling the body part 10 and the hook part 20 is not limited to two, and may be one or any number of three or more.

In the electric balancer 100 of the above embodiment, the eight strain gauges SG1 to SG8 are attached to each of the coupling pins CP1 and CP2; however, the embodiment is not limited to this configuration. The number of the strain gauges attached to the coupling pins CP1 and CP2 may be any plural number. For example, when four strain gauges are attached to each of the coupling pins CP1 and CP2, one Wheatstone bridge is formed by the four strain gauges and the connection circuit.

In the electric balancer 100 of the above embodiment, the circuit substrate 30 is disposed at the back space BS of the housing 11 of the body part 10; however, the embodiment is not limited to this configuration. The circuit substrate 30 can be disposed at any position on the body part 10. Furthermore, even when the circuit substrate 30 is disposed at the back space BS, the protective cover 11c is not essential and may be omitted. In addition, the circuit substrate 30 is disposed at any closed space defined within the body part 10 regardless of the presence or absence of the protective cover 11c, and thus it is possible to prevent the occurrence of an error at the circuit substrate 30 due to changes in wind or humidity.

In the electric balancer 100 of the above embodiment, the central wiring groove WG1 and the back wiring groove WG2 are disposed for the wirings W at the outer peripheral surfaces of the coupling pins CP1 and CP2; however, the embodiment is not limited to this configuration. Specifically, for example, through holes may be provided along the axes of the coupling pins CP1 and CP2, and the through holes may be used as passages for the wirings W.

In the electric balancer 100 of the above embodiment, at least one of the body part 10 and the hook part 20 may be grounded by shield wire processing.

In the above embodiment, the electric balancer 100 having a mode of attaching the strain gauges SG1 to SG8 to the coupling pins CP1 and CP2 has been described as an example; however, the embodiment is not limited to this mode. Any hoisting machine such as a chain block or a winch different from the electric balancer 100 can employ the configuration of the above embodiment of attaching strain gauges to coupling pins and disposing a connection circuit at a position different from positions on the coupling pins. In addition, any mechanism for attaching a strain gauge to a coupling pin and disposing a connection circuit at a position different from a position on the coupling pin can be configured as a load detection mechanism. Specifically, for example, in a mechanism including a first member connected to a fixed structure for supporting the mechanism and a second member for suspending an object being an object under test, a strain gauge is attached to a pin causing the second member to be suspended from the first member by continuously penetrating the first member and the second member, and a connection circuit is formed at a circuit substrate disposed above the second member.

In the present invention and the present specification, the wording that the second member is "suspended" from the first member does not necessarily mean hanging in the direction of gravity, and means that the first member supports the second member so as to regulate movement of the second member in a predetermined direction. Consequently, for example, a state where the second member coupled to the first member by a pin is engaged with a moored ship or the like via a wire, and movement of the second member is regulated by the first member with the second member pulling the first member diagonally downward, diagonally upward, laterally, or the like, is also included in the state where the second member is suspended from the first member.

Second Embodiment

A pin-type load cell of a second embodiment of the present invention is configured by the coupling pins CP1 and CP2 included in the electric balancer 100 of the above embodiment and the strain gauges SG1 to SG8 attached to the coupling pins CP1 and CP2. In the pin-type load cell of the second embodiment, the coupling pins CP1 and CP2 function as pin-type flexure elements. Furthermore, in the pin-type load cell of the second embodiment, the number of strain gauges is any number.

In the pin-type load cell of the second embodiment, a passage for extending a wiring from a strain gauge to the outside is formed as a groove provided at an outer peripheral surface of a pin-type flexure element instead of a through hole along an axis of the pin-type flexure element, and thus it is possible to miniaturize the pin-type flexure element and provide a smaller pin-type load cell.

As long as the features of the present invention are maintained, the present invention is not limited to the embodiments described above, and other forms considered within the scope of the technical concept of the present invention are also included within the scope of the present invention.

REFERENCE SIGNS LIST

10 Body part
11c Protective cover
11p Orientation adjustment plate
20 Hook part
21 Upper hook
22 Coupling base
30 Circuit substrate
100 Electric balancer
AC Amplification circuit
CC Connection circuit
CP1, CP2 Coupling pin
SGl to SG8 Strain gauge
WSB1, WSB2 Wheatstone bridge circuit

The invention claimed is:

1. A load detection mechanism for detecting a load of an object, the load detection mechanism comprising:
   a first member configured to be connected to a fixed structure;
   a second member configured to suspend the object;
   a pin configured to cause the second member to be suspended from the first member by continuously penetrating the first member and the second member;
   a plurality of strain gauges attached to the pin; and
   a circuit substrate disposed on the second member, wherein:
   a connection circuit forming a bridge circuit by connecting the plurality of strain gauges and an amplification circuit configured to amplify output from the bridge circuit are formed on the circuit substrate;
   the pin includes a first pin and a second pin;
   the plurality of strain gauges includes a plurality of first strain gauges attached to the first pin and a plurality of second strain gauges attached to the second pin; and
   the bridge circuit includes a first bridge circuit in which the plurality of first strain gauges is connected and a second bridge circuit in which the plurality of second strain gauges is connected.

2. The load detection mechanism according to claim 1, wherein a groove extending in an axial direction of the pin is formed at an outer peripheral surface of the pin, and a wiring connecting the plurality of strain gauges and the circuit substrate is accommodated inside the groove.

3. The load detection mechanism according to claim 2, wherein at least one of the first member and the second member covers the groove.

4. The load detection mechanism according to claim 1, wherein
   the circuit substrate is disposed within a closed space defined inside the second member.

5. The load detection mechanism according to claim 4, wherein
   one end of the pin is located within the closed space and the circuit substrate is disposed below the one end.

6. The load detection mechanism according to claim 1, wherein
   an orientation adjustment part configured to adjust an orientation of the pin is attached to at least one of the first member and the second member.

7. A pin-type load cell comprising:
   a pin; and
   a plurality of strain gauges attached to the pin, wherein:
   a groove configured to accommodate a wiring connecting the plurality of strain gauges and an exterior is formed at an outer peripheral surface of the pin, the groove extending in an axial direction of the pin;
   the pin includes:
   a first large diameter part which is located at a first side with respect to a center in the axial direction of the pin, and to which a force in a first direction is to be applied;
   a second large diameter part which is located at a second side, opposite to the first side, with respect to the center in the axial direction of the pin, and to which a force in the first direction is to be applied;
   a third large diameter part which is located at the center in the axial direction of the pin, and to which a force in a second direction different from the first direction is to be applied;
   a first small diameter part which is located between the first large diameter part and the third large diameter part, and which has a diameter smaller than a diameter of the first large diameter part, a diameter of the second large diameter part, and a diameter of the third large diameter part; and
   a second small diameter part which is located between the second large diameter part and the third large diameter part, and which has a diameter smaller than the diameter of the first large diameter part, the diameter of the second large diameter part, and the diameter of the third large diameter part;
   the plurality of strain gauges includes a first strain gauge attached to the first small diameter part and a second strain gauge attached to the second small diameter part;
   the groove extends through the second large diameter part, the second small diameter part, the third large diameter part, and the first small diameter part;
   the first strain gauge is attached to a bottom surface of a first recess disposed in the first small diameter part;
   the second strain gauge is attached to a bottom surface of a second recess disposed in the second small diameter part;
   an orientation adjustment surface extending in parallel to an axis of the pin is disposed at an end of the first large diameter part opposite to an end connected to the first small diameter part; and
   the bottom surface of the first recess, the bottom surface of the second recess, and the orientation adjustment surface are parallel to each other.

8. A load detection mechanism for detecting a load of an object, the load detection mechanism comprising:
   a first member configured to be connected to a fixed structure;
   a second member configured to suspend the object;
   a pin configured to cause the second member to be suspended from the first member by continuously penetrating the first member and the second member;
   a plurality of strain gauges attached to the pin; and
   a circuit substrate disposed on the second member, wherein:
   a connection circuit forming a bridge circuit by connecting the plurality of strain gauges and an amplification circuit configured to amplify output from the bridge circuit are formed on the circuit substrate;
   the second member includes a housing;
   the housing defines, in the housing, a driving mechanism accommodation space in which a driving mechanism configured to move the object is accommodated;
   the circuit substrate is disposed in a closed space which is separated from the driving mechanism accommodation space, and which is defined outside the housing and on an upper surface of the housing; and
   an end of the pin is disposed in the closed space.

9. The load detection mechanism according to claim 8, wherein
   a groove extending in an axial direction of the pin is formed at an outer peripheral surface of the pin, and a wiring connecting the plurality of strain gauges and the circuit substrate is accommodated inside the groove.

10. The load detection mechanism according to claim 9, wherein
    at least one of the first member and the second member covers the groove.

11. The load detection mechanism according to claim 8, wherein
    the circuit substrate is disposed below the end of the pin.

12. The load detection mechanism according to claim 8, wherein an orientation adjustment part configured to adjust an orientation of the pin is attached to at least one of the first member and the second member.

\* \* \* \* \*

UNITED STATES PATENT AND TRADEMARK OFFICE
CERTIFICATE OF CORRECTION

PATENT NO. : 12,474,199 B2
APPLICATION NO. : 17/754969
DATED : November 18, 2025
INVENTOR(S) : Okamoto et al.

Page 1 of 1

It is certified that error appears in the above-identified patent and that said Letters Patent is hereby corrected as shown below:

On the Title Page

Item (73) Assignees:
"NAMESBEA MITSUMI Inc. ASSIGNEE, Nagano (JP); KITO CORPORATION, Yamanashi (JP)"

Should read:
-- MINEBEA MITSUMI Inc., Nagano (JP); KITO CORPORATION, Yamanashi (JP) --

Signed and Sealed this
Twentieth Day of January, 2026

John A. Squires
*Director of the United States Patent and Trademark Office*